UNITED STATES PATENT OFFICE.

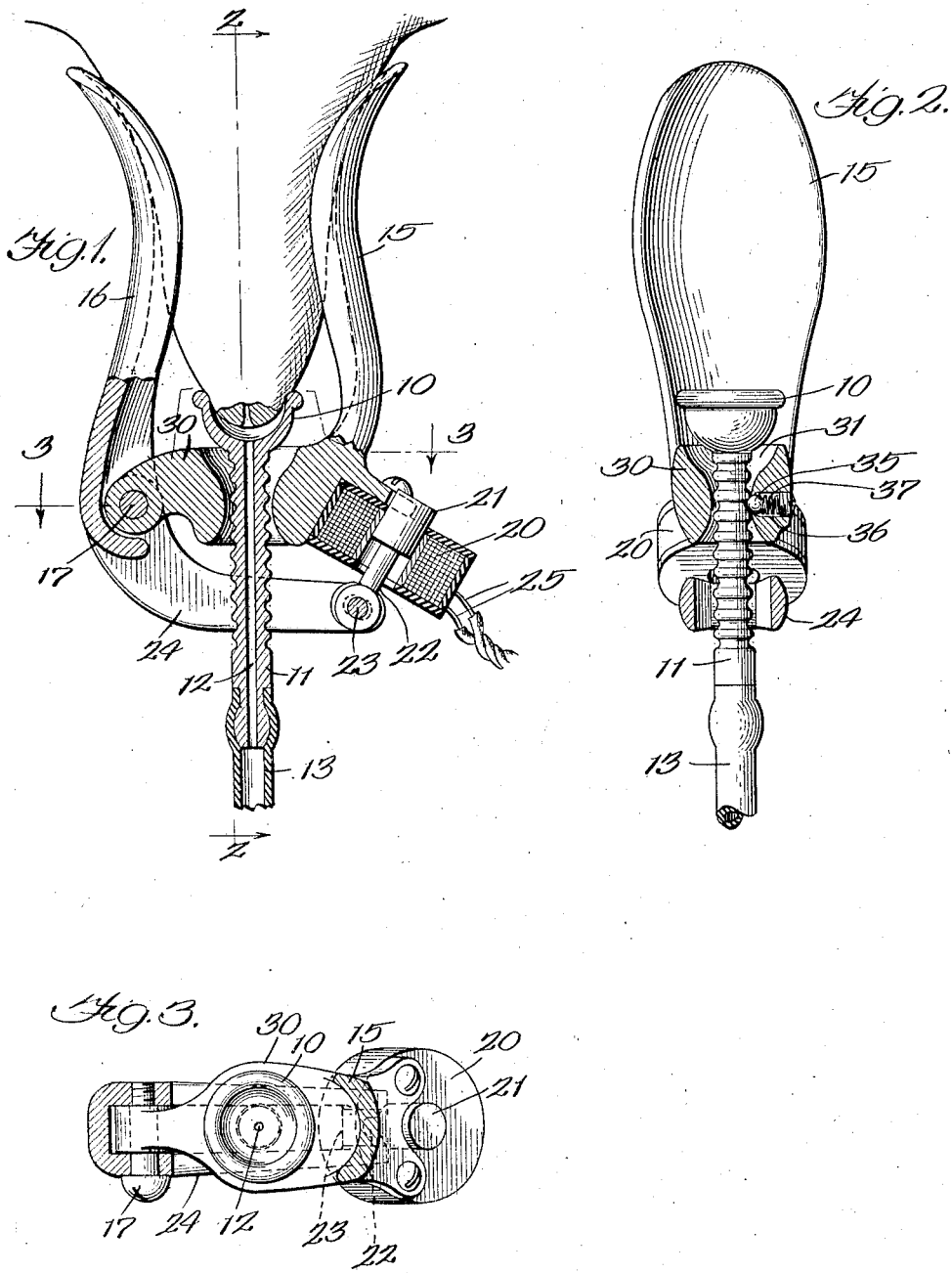

HENRY B. BABSON, OF CHICAGO, ILLINOIS, AND ARTHUR C. MACARTNEY, OF SYRACUSE, NEW YORK.

MILKING-MACHINE.

1,329,452.        Specification of Letters Patent.        Patented Feb. 3, 1920.

Application filed December 16, 1918. Serial No. 266,864.

*To all whom it may concern:*

Be it known that we, HENRY B. BABSON, residing at Chicago, in the county of Cook and State of Illinois, and ARTHUR C. MACARTNEY, residing at Syracuse, in the county of Onondaga and State of New York, HENRY B. BABSON being a citizen of the United States of America and ARTHUR C. MACARTNEY a subject of the King of Great Britain, have invented a certain new and useful Improvement in Milking - Machines, of which the following is a specification.

This invention relates to milking machines and is concerned more particularly with the parts which engage the teats of the animal for inducing the animal to release the milk, and for conveying away the milk released. The general object is to improve this class of devices and to produce a device which will not readily get out of order, which may be readily adjustable to teats of various sizes, and which will produce an action free from any tendency to annoy, irritate or injure the animal. Contributory to this general object are subsidiary objects which will become apparent from the following description and claims taken in connection with the accompanying drawings in which—

Figure 1 is a side elevation partly in longitudinal section of a milking device embodying the invention and shown in position upon the animal.

Fig. 2 is a vertical section on the line 2—2, Fig. 1.

Fig. 3 is a plan section on the irregular line 3—3, Fig. 1.

Similar numerals refer to similar parts throughout the several views.

A vacuum cup 10 is so formed as to fit over the teat of the animal. The height to which it rises on the teat may be varied, in different cases, but as the interior is under vacuum the cup will tend to hold itself in place even though it does not rise very high. Leading away from the cup is a duct 11 having an internal passage 12 for conveying the milk to a hose or pipe 13 leading to the milk receptacle (not shown).

Two pressers 15, 16 are pivoted to one another by a fulcrum pin 17. They are so formed as to fit the sides of the teat and by exerting general pressure intermittently induce the animal to release the milk. The pressers may be operated pneumatically, mechanically or electrically. In the present case we have illustrated electric means consisting of a coil 20 rigidly carried by the presser 15 and having a plunger 21 connected by a stem 22 to a pin 23 carried in a bifurcated arm 24 extending across the bottom of the device from the presser 16. The coil is energized intermittently through the conductors 25 and the parts are so related that when the coil is energized the plunger will be sucked into the coil and cause the pressers to move toward each other a slight distance, thus generating a gentle pressure upon the teat. When the coil is deënergized the resilience of the teat causes the pressers to move apart to normal position.

According to the present design the fulcrum pin 17 is carried at the end of an arm 30 which extends across the device beneath the vacuum cup and is preferably integral with presser 15. This is apertured at the center to form a throat 31 through which duct 11 passes. By preference the throat has a central portion for encircling the duct somewhat closely, and flaring mouths top and bottom for permitting a limited amount of play, angularly, between the duct and the pressers.

The duct and hence also the cup are vertically adjustable relatively to the pressers. The preferred manner of accomplishing this is shown most clearly in Fig. 2 wherein it will be observed that a ball 35 is mounted in an aperture or cage 36 at the side of the throat and backed up by a spring 37 so as to press toward the corrugations or notches formed in the duct 11. As a result of this construction the adjustment may be made by merely forcing the duct up or down in the throat, the ball being temporarily forced back to ride over a ridge in the duct and then automatically seating itself in one of the grooves. These parts form a yieldable catch and it is desirable that the catch be strong enough to support the pressers upon the duct. It is also desirable to so design the parts that the suction in the duct will hold the device in position upon the animal.

The operation will now be readily understood. After the device is adjusted to the animal, electric current is caused to flow intermittently in conductors 25, thus producing a varying pressure upon the teat. The vacuum in duct 11 holds the device in place upon the animal and also expedites the flow of milk to the pail or other receptacle. It will be understood that in practice the device is constructed of thin metal and that its weight is small enough so that it may be readily supported upon the animal by the suction in the vacuum cup. As the parts are few in number and of simple form the device is durable and cannot readily get out of order. It is also instantly adjustable to teats of various sizes and there are no set screws or similar devices to become lost or to do injury either to the attendant or to the animal.

Having thus described the invention what we claim as new and desire to secure by Letters Patent, is:—

1. A milking device having a vacuum cup adapted to hold the device in position upon the teat by suction, a milk duct leading therefrom, pressers supported by said cup and articulately connected together, and means for varying the pressure of said pressers upon the teat for inducing the animal to release the milk.

2. A milking device having a teat cup, a vacuum duct leading therefrom, teat pressers, and means for varying the elevation of the teat cup relatively to the pressers.

3. A milking device having a vacuum cup adapted to engage the teat, a vacuum duct leading therefrom, teat pressers, means for varying the pressure of said pressers upon the teat, and a catch for holding the cup at different elevations relatively to the pressers for the purpose described.

4. A milking device having a vacuum cup adapted to engage the teat, a vacuum duct leading therefrom, teat pressers pivotally connected together, means for moving them about their pivot for varying the pressure upon the teat, one of said pressers having a throat through which the vacuum duct passes, and means at said throat for adjustably holding the vacuum cup at the desired elevation.

5. A milking device having a vacuum cup for engaging the teat, a vacuum duct leading from it, teat pressers articulately connected together, means for varying the pressure of said pressers upon the teat, and a self locking catch carried by one of said pressers, for holding the cup at the elevation to which it may be adjusted.

6. A milking device having a vacuum cup for engaging the teat, a vacuum duct leading from it, teat pressers articulately connected together, means for varying the pressure of said pressers upon the teat, and a self locking catch carried by one of said pressers for holding the cup at the elevation to which it may be adjusted, said catch being yieldable whereby the elevation of the cup may be varied by simply pushing or pulling the cup up or down relatively to the presser.

7. A milking device having two teat pressers hinged together near the bottom, an oscillator carried by one of said pressers, an arm carried by the other of said pressers, and adapted to be operated by said oscillator to vary the pressure of said pressers upon the teat, a vacuum cup for engaging the teat, a vacuum duct leading from said cup, and means whereby the elevation of the cup relatively to the pressers may be adjusted.

8. A milking device having a vacuum cup, a vacuum duct leading therefrom, teat pressers, means for varying the pressure of said pressers upon the teat, said vacuum duct having notches in the side, and a spring pressed ball carried by one of said pressers for yieldingly entering the notches to hold the duct and vacuum cup at the desired elevation relatively to said pressers.

9. A milking device having two teat pressers hinged together, an electromagnetic coil carried by one of said pressers, a plunger carried by the other of said pressers for varying the pressure of said pressers upon the teat when the current through said coil is varied, and a milk duct associated with said pressers for leading away the milk drawn from the teat.

In witness whereof we have hereunto subscribed our names.

HENRY B. BABSON.
ARTHUR C. MACARTNEY.